(No Model.) 2 Sheets—Sheet 1.
W. CORLISS.
BURGLAR PROOF SAFE.
No. 452,449. Patented May 19, 1891.
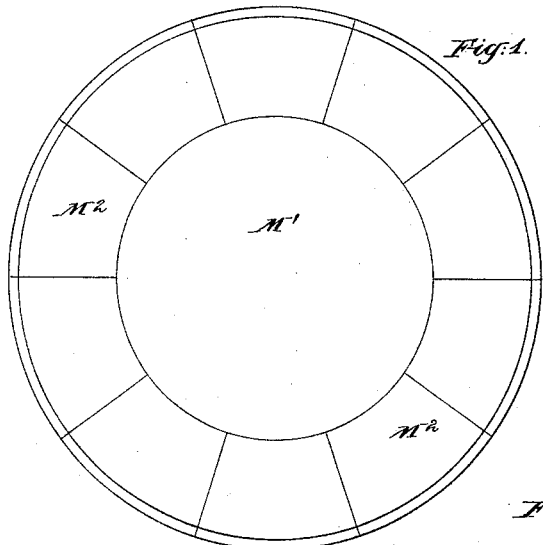
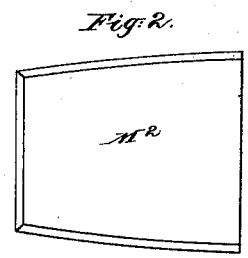
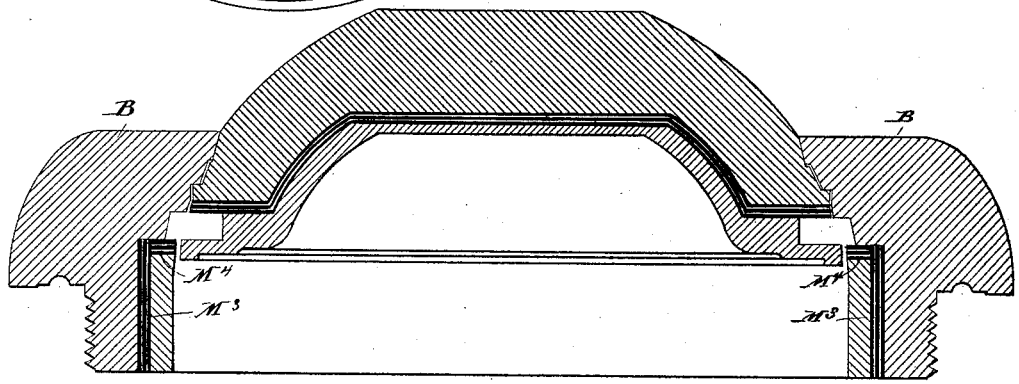
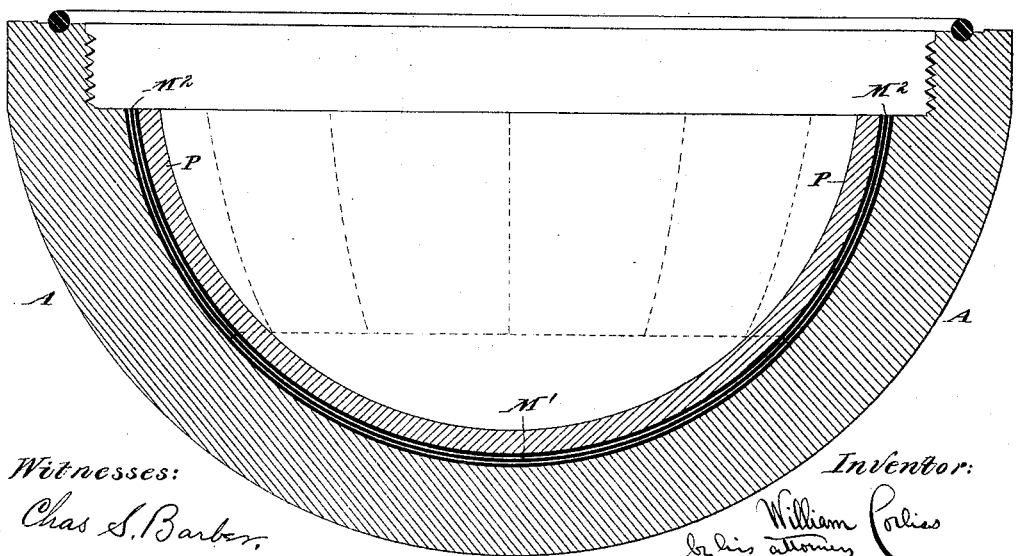
Witnesses:
Chas. S. Barber,
Charles R. Searle.
Inventor:
William Corliss
by his attorneys
Thomas Drew Stetson

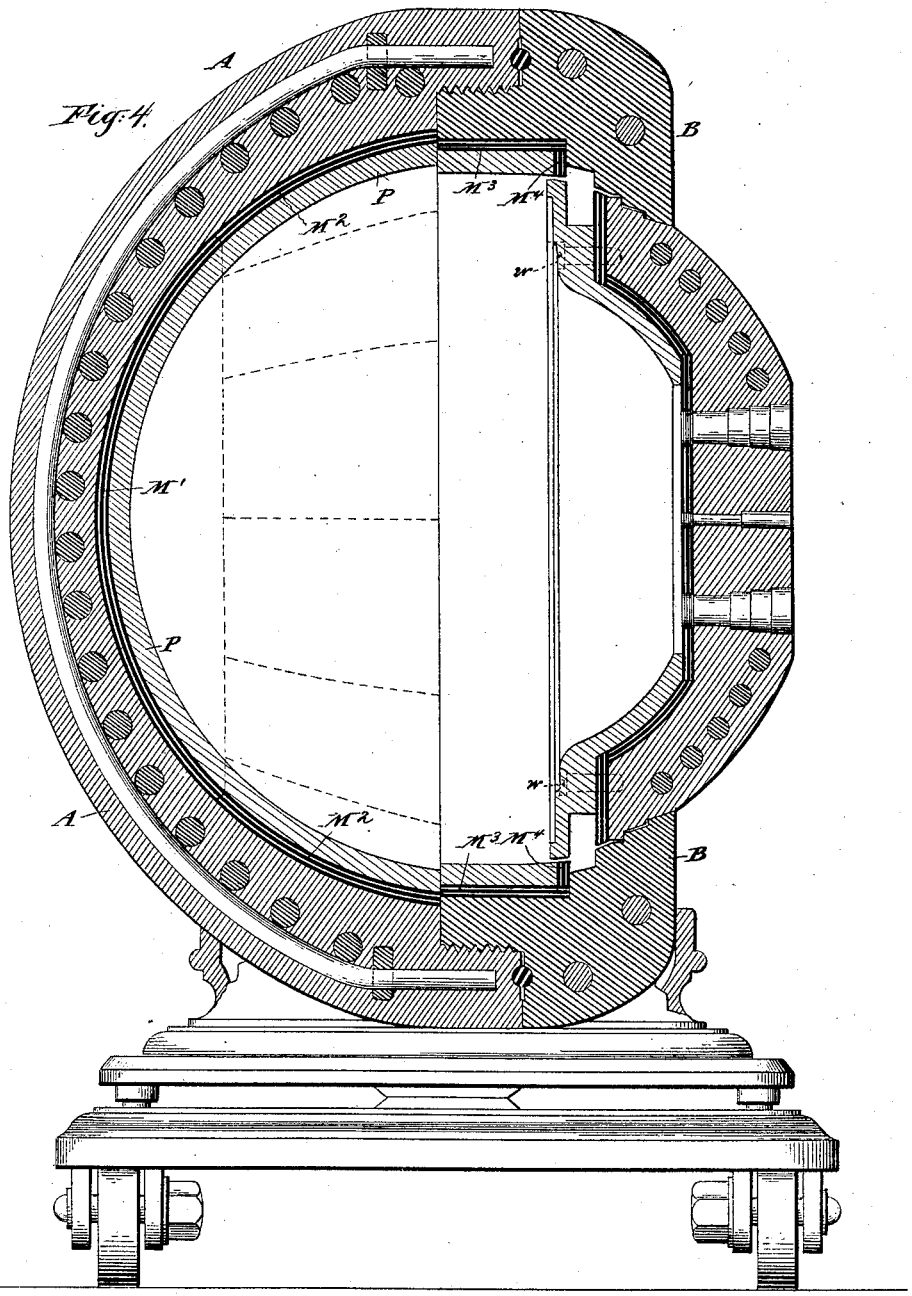

UNITED STATES PATENT OFFICE.

WILLIAM CORLISS, OF PROVIDENCE, RHODE ISLAND.

BURGLAR-PROOF SAFE.

SPECIFICATION forming part of Letters Patent No. 452,449, dated May 19, 1891.

Application filed July 12, 1890. Serial No. 358,544. (No model.)

*To all whom it may concern:*

Be it known that I, WILLIAM CORLISS, of the city and county of Providence, in the State of Rhode Island, have invented a certain new and Improved Method of Constructing Burglar-Proof Safes; and I do hereby declare that the following is a full and exact description thereof.

The invention relates to a lining applied in the interior of a spheroidal shell. I will describe it as applied to the style of safe set forth in the United States patent to me dated July 25, 1882, No. 261,533.

I purchase in the market, or preferably cause to be produced for my use, plates composed of alternate layers of high steel, as file-steel, and soft iron welded together and capable of being worked as a unit. I cut pieces of such plate to the approximate form desired, but a little large, and heat and stamp them between suitable convex and concave dies to give them the required form adapted to match together and to the interior of the shell. These plates are heated again and hardened. If any are much distorted in the hardening, they are rejected. If the operations are properly conducted, a large proportion of the plates will be sufficiently perfect for use. The next proceeding is to grind the edges until each piece is exactly of the proper contour with the proper bevel at the edges. I prepare an interior shell of cast-iron of the same spheroidal form, but smaller, and holding the main shell with its concave side upward and placing the pieces of plate in position, I insert this casting. The front ring is correspondingly lined with laminated plate, nearly cylindrical, correspondingly held in position by a cast-iron lining. The plate and its inner cast-iron lining are held to the door by bolts. The plate and the lining in the ring and the main shell are supported without requiring any bolts, and consequently without any holes in the plates. Now, inserting the door into the front ring with its annular sectional locking-bolt in position, the ring is screwed firmly down into its place relatively to the main shell. When this is done, the parts are firmly and reliably held, the edges of the plate-lining of the main body abutting against the adjacent portion of the ring, and being thereby held, and the edges of the plates and of the lining-shell abutting against the adjacent parts of the main body. Now the safe is ready to be set in an upright position and used.

The accompanying drawings form a part of this specification.

Figure 1 is a face view of the circular dished lining. Fig. 2 is a face view of one of the dished segmental pieces alone. Fig. 3 is a central vertical section through the main body and with the plate-lining and the inner shell applied, the whole being in the position for putting the parts together, the lining parts being held by gravity in the main shell until the front ring is screwed down. Fig. 3 also shows the front ring with its contained door in the act of being applied to the main shell to complete the safe. Fig. 4 is a central vertical section showing the safe completed, the lining being firmly held in the main body without bolts.

Similar letters of reference indicate corresponding parts in all the figures where they appear.

A is the shell of the main body, and B the shell of the front ring, both of white cast-iron deeply chilled on the exterior side, containing within its thickness a basket-work of soft wrought-iron, contributing its strength and toughness. These parts are screwed together and the joints secured, all in the manner set forth in my aforesaid patent of 1882.

Directing attention to the main body or spheroidal shell A and its contained parts, $M'$ $M^2$, &c., are properly-dished pieces of welded plate, sometimes known as "laminated" plates. These plates may be five-eighths of an inch in thickness, being composed of five pieces or plates, three of high steel, as the best cast-steel, having interposed two plates of soft wrought-iron, and welded.

P is the inner shell or lining of cast-iron. The edge of this shell and the adjacent edges of the plates $M'$ $M^2$, &c., and the adjacent edge of the body A must be carefully finished to coincide. The preparation of the ring B involves less difficulty. The plates may be in two pieces, each a continuous ring, one $M^3$ being nearly cylindrical and another narrower one $M^4$ lying in a plane at right angles to the axis. The lining-casting P for the ring may be matched tightly and forced home by a hydraulic press.

The lining of the door correspondingly differs, as already stated, from the lining of the main body in being held by bolts, as indicated by dotted lines at w w. This mode of construction contributes greatly to the impenetrability of the safe. If a burglar shall by good fortune bore through the outer work, the layers of hard and soft material lying at this depth in the shell will break his drill, and it is impracticable at that depth in the metal to soften the steel by a blow-pipe flame.

I claim as my invention—

1. The within-described method of lining spheroidal safes by striking up laminated plates into the required spheroidal sections and hardening them, finishing their edges to proper form, holding them by gravity in a previously-formed semi-spheroidal shell, applying a previously-formed interior shell correspondingly spheroidal, bringing the other part of the spheroidal shell into contact with the edges of such lining, and thereby holding the whole firmly, as herein specified.

2. The spheroidal safe described, having an outer sectional shell of cast metal screwed together and a lining of laminated plates in sections struck up into spheroidal form and hardened, with their edges finished to match firmly together and held by the outer shell, in combination with each other and with an inner lining-shell, all arranged to serve as herein specified.

In testimony whereof I have hereunto set my hand, at Providence, Rhode Island, this 14th day of May, 1890, in the presence of two subscribing witnesses.

WILLIAM CORLISS.

Witnesses:
EDWIN P. ALLEN,
HENRY J. DUBOIS.